United States Patent [19]

De Dompierre

[11] Patent Number: 4,763,422
[45] Date of Patent: Aug. 16, 1988

[54] DEVICE FOR PRESETTING THE TOOLS IN A PLATEN PRESS

[75] Inventor: Jean B. De Dompierre, Echandens, Switzerland

[73] Assignee: Bobst SA, Switzerland

[21] Appl. No.: 41,445

[22] Filed: Apr. 23, 1987

[30] Foreign Application Priority Data

Apr. 30, 1986 [CH] Switzerland ............. 1760/86

[51] Int. Cl.$^4$ ............................................. B23Q 7/04
[52] U.S. Cl. ....................................... 33/569; 33/626; 108/1; 108/8
[58] Field of Search ............. 33/626, 627, 569, 570, 33/573; 51/240 R, 240 T, 240 S; 108/1, 6, 8

[56] References Cited

U.S. PATENT DOCUMENTS

| 976,759 | 11/1910 | Weingaertner | 108/8 |
| 2,846,761 | 8/1958 | Evans | 108/8 X |
| 3,289,612 | 12/1966 | Mouw | 108/8 X |
| 3,435,783 | 4/1969 | Kollenborn | 108/8 |

FOREIGN PATENT DOCUMENTS 2013113 8/1979 United Kingdom .

Primary Examiner—William D. Martin, Jr.
Attorney, Agent, or Firm—Hill, Van Santen, Steadman & Simpson

[57] ABSTRACT

A presetting device for tools used in a press such as a platen press, including by a cradle for slidably receiving each of the tools and being mounted by a turret on a carriage which is shifted along a vertically extending column, which column can be rotated around a vertical axis on a base. The device enables positioning the height of the cradle and also rotating the cradle around both the horizontal and vertical axis to gain access to the tools during the setup operation.

7 Claims, 3 Drawing Sheets

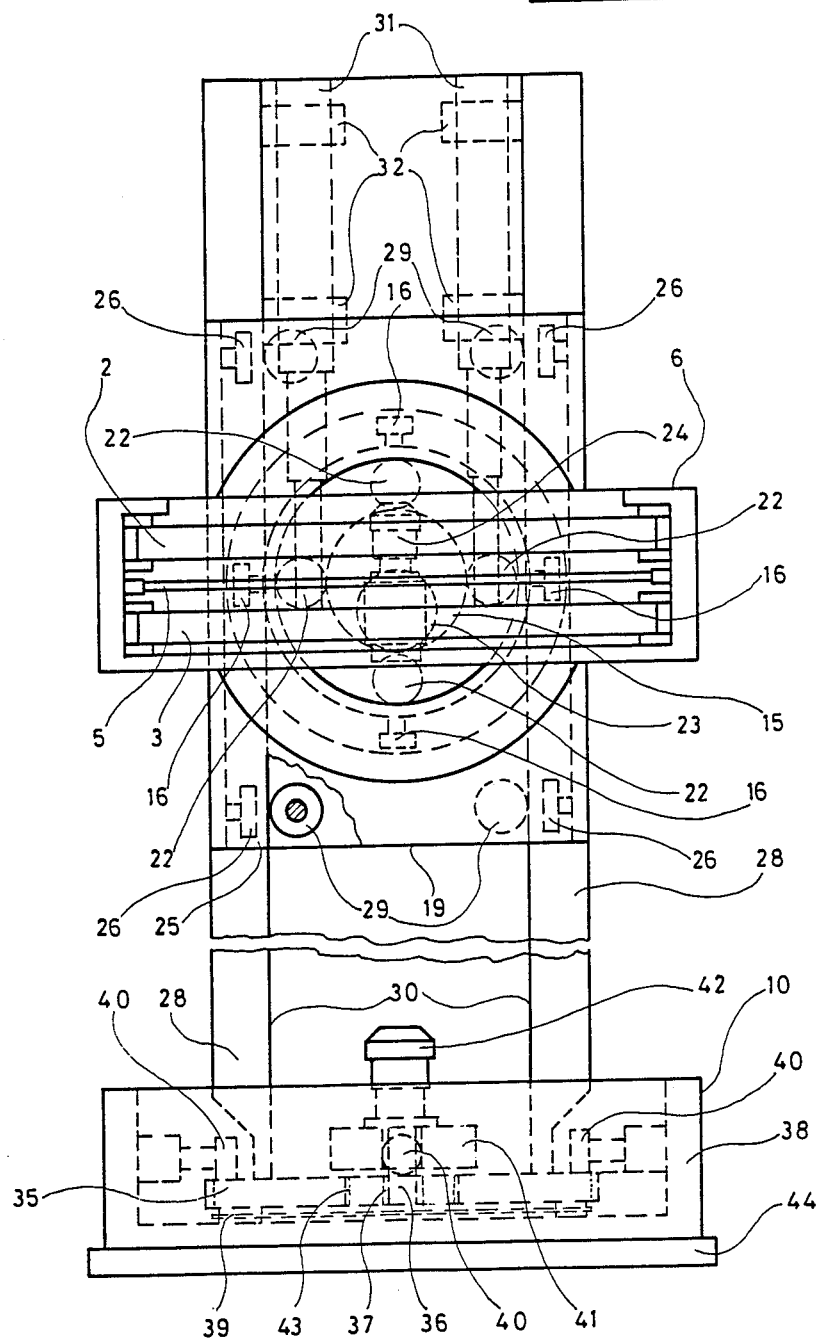

DEVICE FOR PRESETTING THE TOOLS IN A PLATEN PRESS

BACKGROUND OF THE INVENTION

The present invention is directed to a device for presetting of tools which are used in a platen press, particularly at the delivery station of the press.

Devices for presetting of upper and lower tools, which are removed from a machine and which tools are for stripping the waste of a previously cut blank are well known. These devices usually look like a pivoting table which is mounted at a given height between two frames and locked in a horizontal position. The object of such a table is to reproduce outside of the machine the operating conditions for the upper and lower tools. Therefore, with a presetting device each element of the upper and lower tool can be positioned with regard to the waste that is to be stripped from a sheet which is being processed in the platen press. However, with these well known devices, it is almost impossible to reach the center area of the large tools and to modify the plane for setting the tools as the pivot point lies in the center. Thus, a device which insures the user of an easy presetting of large tools is still not available.

SUMMARY OF THE INVENTION

The present invention is directed to providing a device which first overcomes the above-mentioned drawbacks and, secondly, complies with ergonomic requirements for an easy and operational use of the device.

To accomplish these goals, the present invention is directed to a device for presetting tools which are to be used in a platen press, said device including a base, a column, first means for mounting the column on the base and for rotating the column about a first or a substantially vertical axis, a carriage, second means for mounting the carriage on the column and for shifting the carriage along the column, a cradle for receiving the tools, and turret means for mounting the cradle on the carriage and for rotating the cradle on a second axis extending approximately at right angles to the first axis.

Other advantages and features of the invention will be readily apparent from the following description, drawings and claims.

BRIEF DESCRIPTION OF THE DRAWINGS

FIG. 3 is a second side view taken in the direction of arrow A of FIG. 2.

DESCRIPTION OF THE PREFERRED EMBODIMENTS

Figure 1:
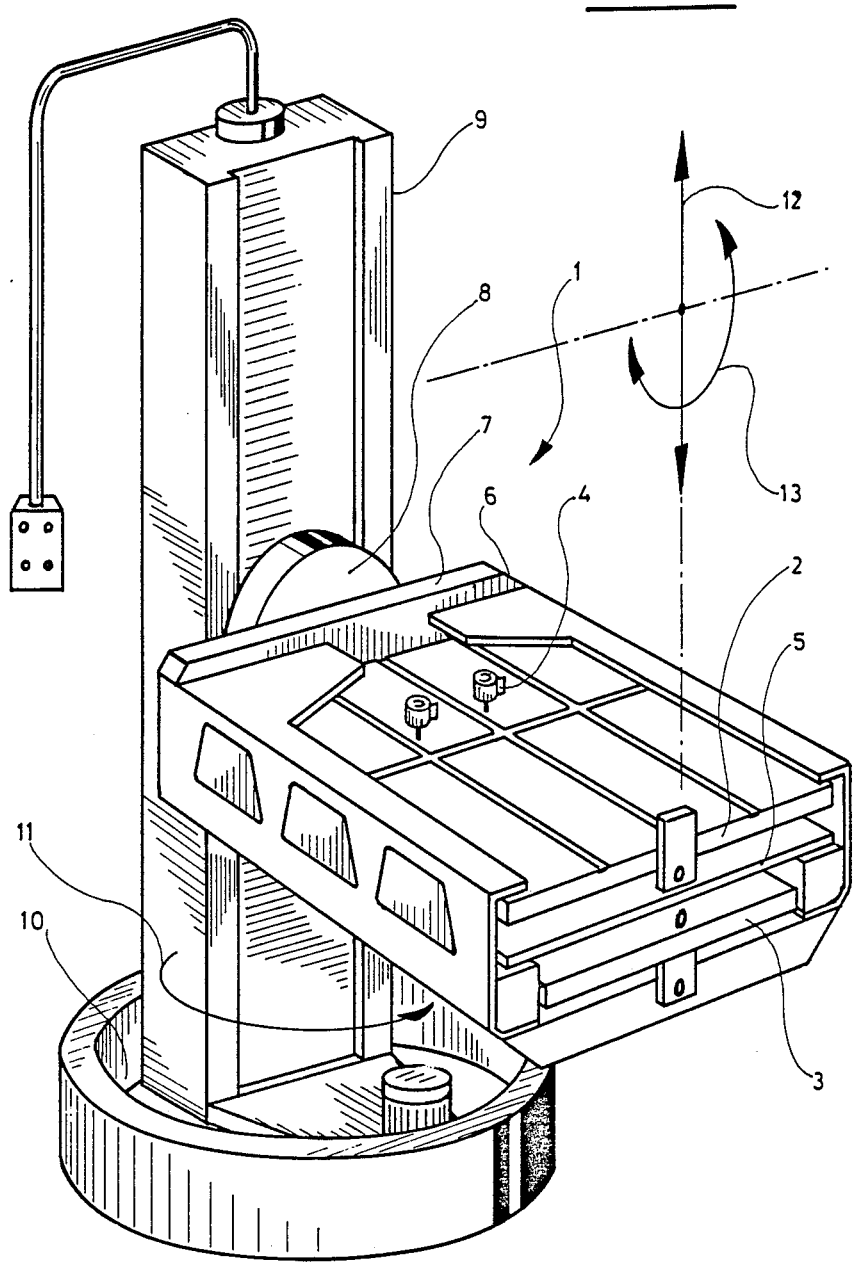
FIG. 1 is a perspective view of the presetting device in accordance with the present invention.

The principals of the present invention are particularly useful when incorporated in a presetting device, generally indicated at 1 in FIG. 1. The presetting device 1 receives upper and lower tools 2 and 3, which are provided with elements 4. When the upper and lower tools are mounted in a press, such as a platen press, the tools with the elements 4 coact to strip waste from sheets, which have been previously cut at a cutting station, such as the cutting station of a platen press.

As illustrated in FIG. 1, the upper and lower tools 2 and 3 are mounted in a cradle 6 with a transparent plate 5 being positioned therebetween. Preferably, either a stripped sheet or a reproduction of the stripped sheet is positioned on the transparent plate 5 to enable an accurate positioning of the elements on both the upper and lower tools, which are facing each other. This presetting operation is well known.

The device 1 can be kept in a tool preparation room, for instance to facilitate the loading of already set tools in a tool holder which tool holder is then placed in front of the delivery station of the platen press for a fast change of tools. The device could also be placed near the delivery station of the platen press in order to be taken or moved in front of the station to change the tools and then be removed to another area if the operator prepares the tools for the next job while the machine or press is running.

Figure 2:
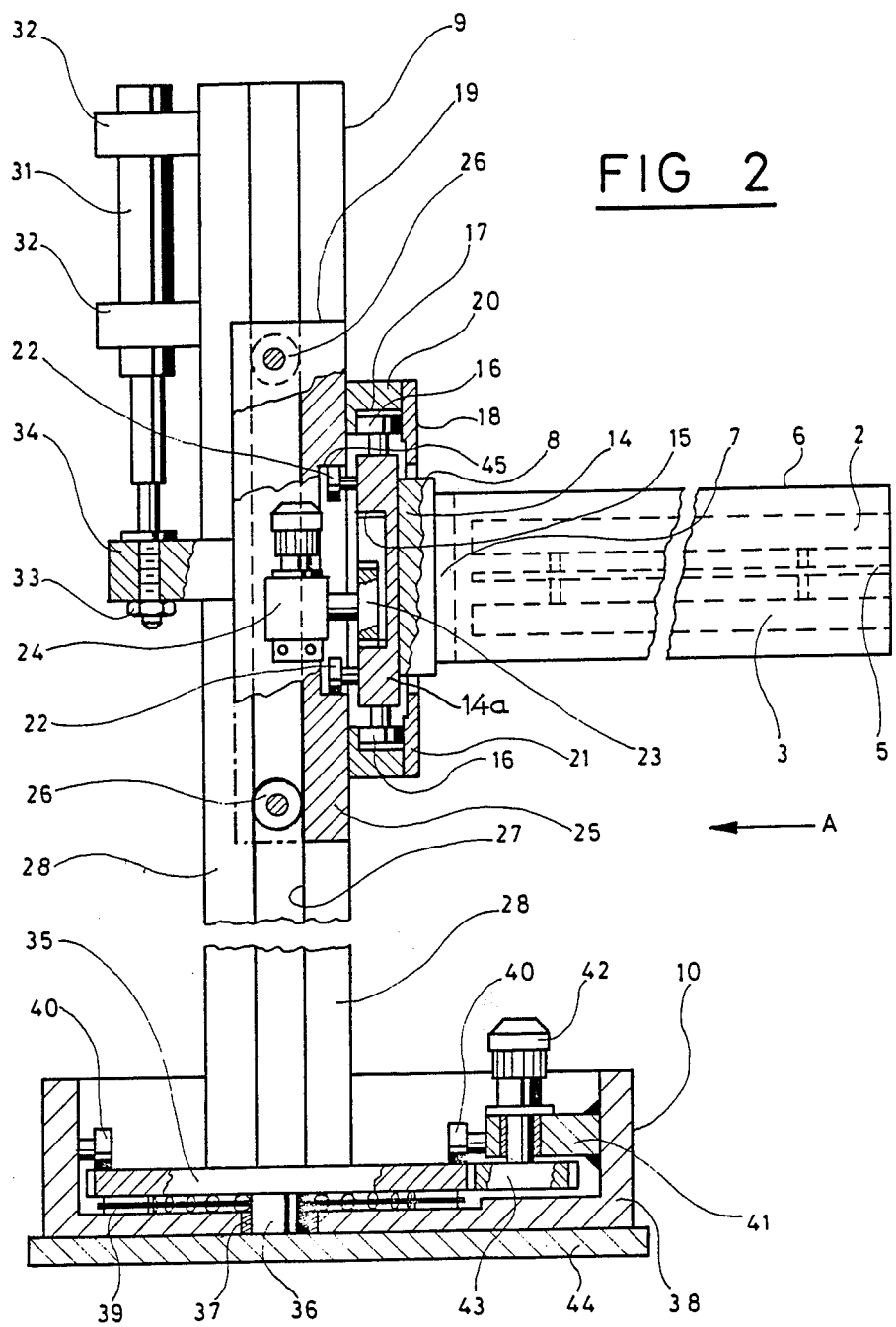
FIG. 2 is a side view with portions broken away for purpose of illustration of the presetting device of the present invention.

The upper and lower tools 2 and 3, as well as the transparent plate 5, are arranged in a cradle which has a base plate 7, which is mounted on turret means 8 which is arranged on a carriage 19 (FIGS. 2 and 3). The carriage 19 (which is not illustrated in FIG. 1) is vertically shifted up and down a column 9. The column 9 is mounted on a base or stand 10 by first means which enables the column to be rotated around a first axis in a direction of arrow 11. The first axis is a substantially vertical axis. The carriage 19 (FIGS. 2 and 3) is mounted on the column by second means, which enable its shifting vertically along the column and along the first or vertical axis, as indicated by the double arrow 12. The turret means enables rotation of the carriage 6 and the tools contained therein around a second axis, as indicated by the double arrow 13. This second axis is substantially at right angles or perpendicular to the first axis and is, thus, a horizontal axis.

As best illustrated in FIG. 2, the cradle 6 has a back wall portion 7 and two side portions or walls which slidably receive each of the tools 2 and 3, as well as a transparent plate 5. Also, as illustrated, each of the tools 2 and 3 are plate-like members having the elements such as 4.

As best illustrated in FIG. 2, the turret means or turret 8 is composed of a disk 14 which is secured to the rear wall 7 of the cradle 6, preferably by fastening means. The disk 14 is mounted on a second plate 14a, which has a recess which has an inner tooth crown or track 15. On a circumference of the disk 14a, a plurality of tension rollers 16 are mounted and are received in a circular groove 17, which is machined in a crown 18 that is attached to the carriage 19. The crown 18 is formed by a ring member 20 having a circular cover plate 21 which enable setting the amount of play or tolerance for the operating tension applied to the rollers 16. The tension rollers 16 preferably include ball bearings and will compensate for forces generated by the cantilever support of the cradle 6. The rotation of the guiding disk 14 is also assured by several rollers 22 which are mounted on a rear or opposite face of the plate 14a, and rotate on axes that are parallel to the second axis. The rollers 22 are engaged on a circular track 45, formed by a chamber of recess, which has been machined into a frame member 25 of the carriage 19.

Rotation of the cradle 6 around the second axis, which is illustrated as a horizontal axis, is caused by a toothed pinion 23 engaging on the inner tooth track 45 of the crown or recess 15. The pinion 23 is mounted on an output shaft of a motor driven reduction gear unit which is secured on the cradle 19.

As best illustrated in FIGS. 2 and 3, the carriage 19 has a frame member 25, which has a U-shape and this frame member 25 supports a first group of rollers 26 and a second group of rollers 29. The rollers 26 are on the side portions of the U-shaped frame and are received in a track 27 which is formed by a groove in each leg member 28 of the column 9 (see FIG. 2). The second group or set of rollers 29 engage an inner face or track 30 of each of the legs 28 to insure vertical guiding of the carriage as it is shifted vertically along the column 9. The vertical shifting of the carriage is performed with two shifting means, which are illustrated as comprising two telescopic jacks 31, which are mounted by supports 32 on the legs 28 of the column. The rods of these jacks 31 are secured to a fixing piece 34 by nuts 33 and the fixing piece 34 is connected to two flanges of the frame 25 of the carriage 19.

The lower end of the legs 28, which form the column 9, are secured on a toothed wheel 35, which wheel has the projection 36 engaged in a bushing 37 in a fixed part 38 of the stand or base 10. Between the wheel 35 and the fixed part 38 is a roller bearing 39. The toothed wheel 35 is rotated on the roller bearing 39 to rotate the column 9. To maintain the column 9 in a vertical manner, the means for mounting also includes rollers 40 which are mounted on the fixed part 38 of the base and engage an upper surface of the toothed wheel 35. The fixed part 38 also has a support 41 where one of the rollers 40 is mounted and the support 41 also mounts a reduction gear and motor unit or arrangement 42 having a shaft on which a drive pinion 43 is mounted to engage the toothed wheel 35. In the illustration, the fixed part 38 of the stand or base 10 is mounted on a base plate 44, which can either be secured to a floor of a preparation room or on a stand of a machine with regard to the particular chosen option. It is also possible to provide the base plate 44 with movable elements to enable transporting the device from one location to another.

With such an execution, the presetting device 1 allows any height setting. It also allows the loading of a tool holder, the tools of which can be arranged in any vertical position. Since the cradle can be pivoted or rotated on a horizontal axis, the operator can position it so that it becomes very easy to reach the elements, even if they are placed in the center of a large tool or tool form.

The present invention thus facilitates the operator's work and applies the ergonomic rules. Besides the easy setting of the delivery tools in a platen press, the device also can load an already prepared tool, either in the delivery station of the machine or in a tool holder.

Although various minor modifications may be suggested by those versed in the art, it should be understood that I wish to embody within the scope of the patent granted hereon all such modifications as reasonably and properly come within the scope of my contribution to the art.

I claim:

1. A device for presetting tools which are to be used in a platen press, said device including a base, a column, first means for mounting the column on the base on a first axis and for rotating the column on said first axis, a carriage, second means for mounting the carriage on the column and for shifting the carriage along the length of the column, a cradle for receiving the tools, and turret means for mounting the cradle on the carriage and for rotating the cradle on a second axis extending approximately at right angles to the first axis, said turret means including a guiding disk secured to the cradle and having a first group of rollers circumferentially spaced on the circumference of the disk, a ring member being secured to the carriage and having a circular groove for receiving the first group of rollers, a second group of rollers mounted on said guiding disk to extend parallel to the second axis, said second group of rollers being received on a second roller track formed on a frame of the carriage, said guiding disk having an inner toothed track, a pinion gear mounted on an output shaft of a motor and gear reduction unit secured on the carriage with the toothed pinion engaging said tooth track.

2. A device according to claim 1, wherein the column has a pair of side legs, each of said side legs having grooves forming a first track and an inner surface forming a second track, said second means including a first group of rollers mounted on a frame of the carriage and being received in said grooves forming the first track on each leg of the column, a second group of rollers mounted on said frame engaging each of the second tracks on the inner surfaces of the legs, said frame having a fixing piece, said means for shifting including telescopic jacks with output rods, said jacks being secured on the column and having their output rods secured to said fixing piece.

3. A device according to claim 1, wherein the first means for mounting and rotating the column include a toothed wheel having a projection received in a bushing on the base, a roller bearing positioned between said toothed wheel and base, said base having a fixed part mounting rollers engaging an upper surface of the toothed wheel to maintain the column on said first axis, a drive motor and reduction gear unit being mounted on said fixed part and having a pinion gear on the output shaft of the unit, said pinion gear engaging the tooth wheel for rotating the toothed wheel and column on the first axis of said bushing.

4. A device according to claim 3, wherein the column has a pair of side legs, each of said side legs having grooves forming a first track and an inner surface forming a second track, said second means including a first group of rollers mounted on a frame of the carriage and being received in said grooves forming the first track on each leg of the column, a second group of rollers mounted on said frame engaging each of the second tracks on the inner surfaces of the legs, said frame having a fixing piece, said means for shifting including telescopic jacks with output rods, said jacks being secured on the column and having their output rods secured to said fixing piece.

5. A device for presetting tools which are to be used in a platen press, said device including a base, a column, first means for mounting the column on the base on a first axis and for rotating the column on said first axis, a carriage, second means for mounting the carriage on the column and for shifting the carriage along the length of the column, a cradle for receiving the tools, and turret means for mounting the cradle on the carriage and for rotating the cradle on a second axis extending approximately at right angles to the first axis, said column having a pair of side legs, each of said side legs having grooves forming a first track and an inner surface forming a second track, said second means including a first group of rollers mounted on a frame of the carriage and being received in said grooves forming the first track on each leg of the column, a second group of rollers mounted on said frame engaging each of the second tracks on the inner surfaces of the legs, said frame having a fixing piece, said means for shifting including telescopic jacks with output rods, said jacks being secured on the column and having their output rods secured to said fixing piece.

6. A device according to claim 5, wherein the first means for mounting and rotating the column include a toothed wheel having a projection received in a bushing on the base, a roller bearing positioned between said toothed wheel and base, said base having a fixed part mounting rollers engaging an upper surface of the toothed wheel to maintain the column on said first axis, a drive motor and reduction gear unit being mounted on said fixed part and having a pinion gear on the output shaft of the unit, said pinion gear engaging the toothed wheel for rotating the toothed wheel and column on the first axis of said bushing.

7. A device for presetting tools which are to be used in a platen press, said device including a base, a column, first means for mounting the column on the base on a first axis and for rotating the column on said first axis, a carriage, second means for mounting the carriage on the column and for shifting the carriage along the length of the column, a cradle for receiving the tools, and turret means for mounting the cradle on the carriage and for rotating the cradle on a second axis extending approximately at right angles to the first axis, the first means for mounting and rotating the column including a toothed wheel having a projection received in a bushing on the base, a roller bearing being positioned between said toothed wheel and base, said base having a fixed part mounting rollers engaging an upper surface of the toothed wheel to maintain the column on said first axis, a drive motor and reduction gear unit being mounted on said fixed part and having a pinion gear on the output shaft of the unit, said pinion gear engaging the toothed wheel for rotating the toothed wheel and column on the first axis of said bushing.

* * * * *